United States Patent
Furukawa et al.

(10) Patent No.: US 8,477,455 B2
(45) Date of Patent: Jul. 2, 2013

(54) NOISE AND PARTICLE SHIELD FOR CONTACT SENSOR IN A SLIDER

(75) Inventors: Masaru Furukawa, Kanagawa (JP); Yuki Shimizu, Kanagawa (JP); Junguo Xu, Ibaraki (JP); Yohji Maruyama, Saitama (JP); Takayoshi Ohtsu, Kanagawa (JP); Toshiya Shiramatsu, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 188 days.

(21) Appl. No.: 12/947,796

(22) Filed: Nov. 16, 2010

(65) Prior Publication Data
US 2012/0120528 A1 May 17, 2012

(51) Int. Cl.
*G11B 5/02* (2006.01)

(52) U.S. Cl.
USPC ...................................... 360/234.4

(58) Field of Classification Search
USPC ................... 360/234.4, 235.4, 235.7
See application file for complete search history.

(56) References Cited

U.S. PATENT DOCUMENTS

| | | | |
|---|---|---|---|
| 5,739,972 A * | 4/1998 | Smith et al. | 360/77.03 |
| 5,793,576 A * | 8/1998 | Gill | 360/327 |
| 6,052,243 A | 4/2000 | Shimada | |
| 6,195,219 B1 * | 2/2001 | Smith | 360/66 |
| 6,822,814 B2 | 11/2004 | Ng et al. | |
| 7,027,263 B2 * | 4/2006 | Ottesen et al. | 360/234.4 |
| 7,108,349 B2 | 9/2006 | Sarmast et al. | |
| 7,589,928 B2 * | 9/2009 | Roy et al. | 360/75 |
| 7,623,314 B2 | 11/2009 | Yamashita et al. | |
| 7,675,715 B2 * | 3/2010 | Arasawa et al. | 360/319 |
| 2006/0119974 A1 | 6/2006 | Yamazaki et al. | |
| 2006/0158768 A1 | 7/2006 | Tanabe | |
| 2008/0043363 A1 | 2/2008 | Yamashita et al. | |
| 2008/0055772 A1 | 3/2008 | McMillan et al. | |
| 2008/0247079 A1 | 10/2008 | Satoh et al. | |
| 2008/0259480 A1 | 10/2008 | Pham et al. | |
| 2011/0149706 A1 * | 6/2011 | Duan et al. | 369/53.41 |
| 2012/0201108 A1 * | 8/2012 | Zheng et al. | 369/13.26 |

OTHER PUBLICATIONS

Suzuki, et al., "Measurement of Flash Temperature and Contact Between Slider and Magnetic Recording Disk", *IEEE Xplore*, (Sep. 1989),3728-3730.

Schreck, et al., "Thin Film Thermocouple Sensors for Measurement of Contact Temperatures During Slider Asperity Interaction on Magnetic Recording Disks", *IEEE Xplore*, (Sep. 1992),2548-2550.

Lin Lam, et al., "A Novel In Situ Monitoring Method for Head/Media Contact", *IEEE Xplore*, (Jun. 2007),2286-2288.

Sciencedirect, "Head-Disk Contact Detection in the Hard-Disk Drives", 1-3.

* cited by examiner

*Primary Examiner* — Angel Castro

(57) ABSTRACT

A slider comprising a contact sensor element configured to respond to a change in resistance due to a change in temperature, and a shield structure. The shield structure comprises a lower thermal conductivity than the contact sensor element and a greater hardness than the contact sensor element.

6 Claims, 6 Drawing Sheets

NOISE AND PARTICLE SHIELD FOR CONTACT SENSOR IN A SLIDER

BACKGROUND

The following problems may occur regarding a shield structure around contact sensor element: (1) Heat is taken by the shield structure at the time of contact with particles. Accordingly, contact detection sensitivity is reduced. (2) If the projection of shield structure (in the direction of the disk) is smaller than the projection of the contact sensor element, particles may pass the shield structure and collide with the contact sensor element. Accordingly, the contact sensor element may become damaged. (3) If the projection of shield structure (in the direction of the disk) is smaller than the projection of the contact sensor element, the contact sensor element may not contact the disk. Accordingly, contact detection sensitivity may fall. (4) When particles contact shield structure, the shield structure is dragged by the particles. An electrical short between the shield structure and the contact sensor element, or the shield structure and an electrode of contact sensor element may result in damage to the contact sensor element.

The drawings referred to in this description should be understood as not being drawn to scale except if specifically noted.

SUMMARY

A shield structure constituted from a metal of lower thermal conductivity than the contact sensor element and greater hardness than the contact sensor element is provided in the periphery of the contact sensor element.

This shield structure is constituted from, for example, an Fe, Ni, Cu or Cr alloy. The shield structure is electrically connected to the main body portion of the slider. Furthermore, the power supply electrodes of the contact sensor element are electrically connected to the main body portion of the slider by way of a resistor. As a result, the GND electric potential of the shield structure and the contact sensor element is kept at a constant, and the effects of any shorting between the shield structure and the contact sensor element are reduced.

In addition, a circuit for monitoring the contact sensor element resistance value in order to evaluate the extent of damage is provided.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
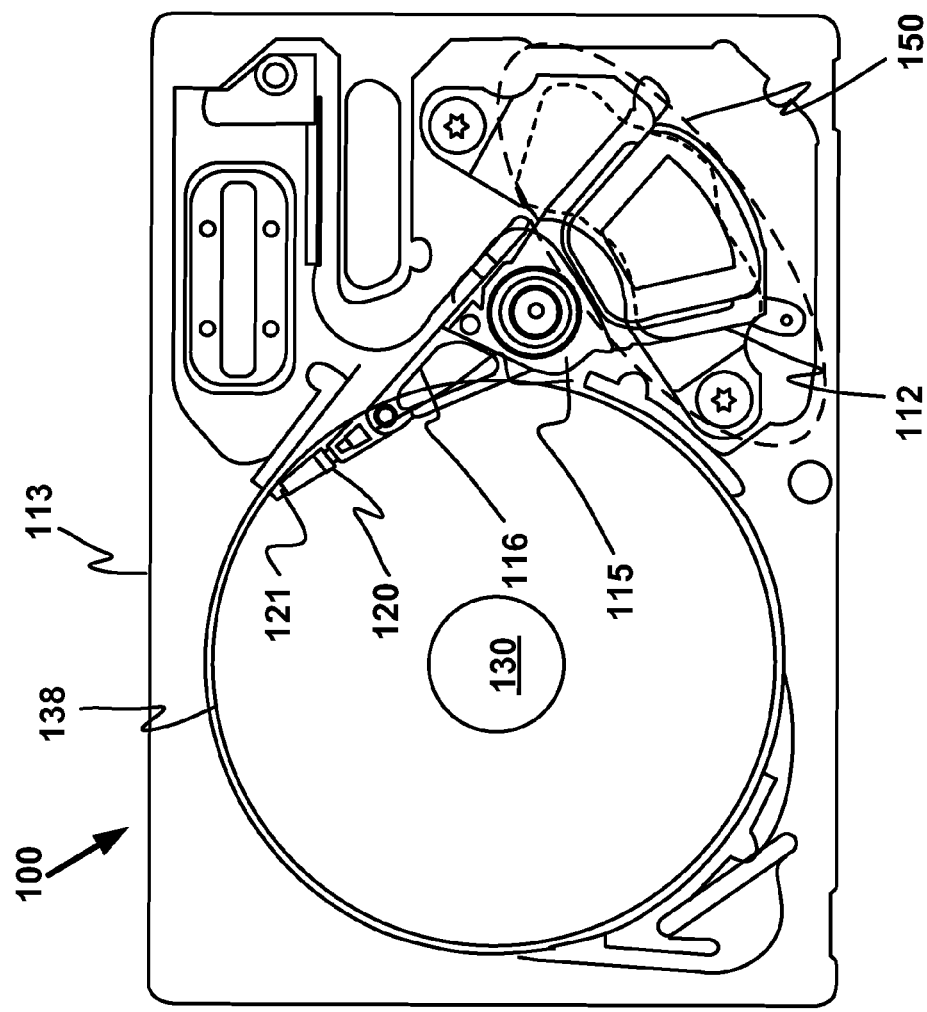
FIG. 1 illustrates an example of a hard disk drive, in accordance with an embodiment of the present invention.

With reference now to FIG. 1, a schematic drawing of one embodiment of an information storage system including a magnetic hard disk file or HDD 100 for a computer system is shown, although only one head and one disk surface combination are shown. What is described herein for one head-disk combination is also applicable to multiple head-disk combinations. In other words, the present technology is independent of the number of head-disk combinations.

In general, HDD 100 has an internal base plate 113 and an internal cover (not shown). In one embodiment, internal housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the circumferential direction relative to internal base plate 113. An actuator assembly 115 includes one or more actuator arms 116. When a number of actuator arms 116 are present, they are usually represented in the form of a comb that is movably or pivotally mounted to base/housing 113. A controller 150 is also mounted to internal base plate 113 for selectively moving the actuator arms 116 relative to the disk 138. Actuator assembly 115 may be coupled with a connector assembly, such as a flex cable to convey data between arm electronics and a host system, such as a computer, wherein HDD 100 resides.

In one embodiment, each actuator arm 116 has extending from it at least one cantilevered integrated lead suspension (ILS) 120. The ILS 120 may be any form of lead suspension that can be used in a data access storage device. The level of integration containing the slider 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the actuator assembly 115 by controller 150 causes the head gimbal assembly to move along radial arcs across tracks on the surface of disk 138.

FIGS. 2A-D illustrate head sliders 13A-D. Head sliders 13A-D are all similar. However, they have slight differences which will be described in detail below.

Figure 2A:
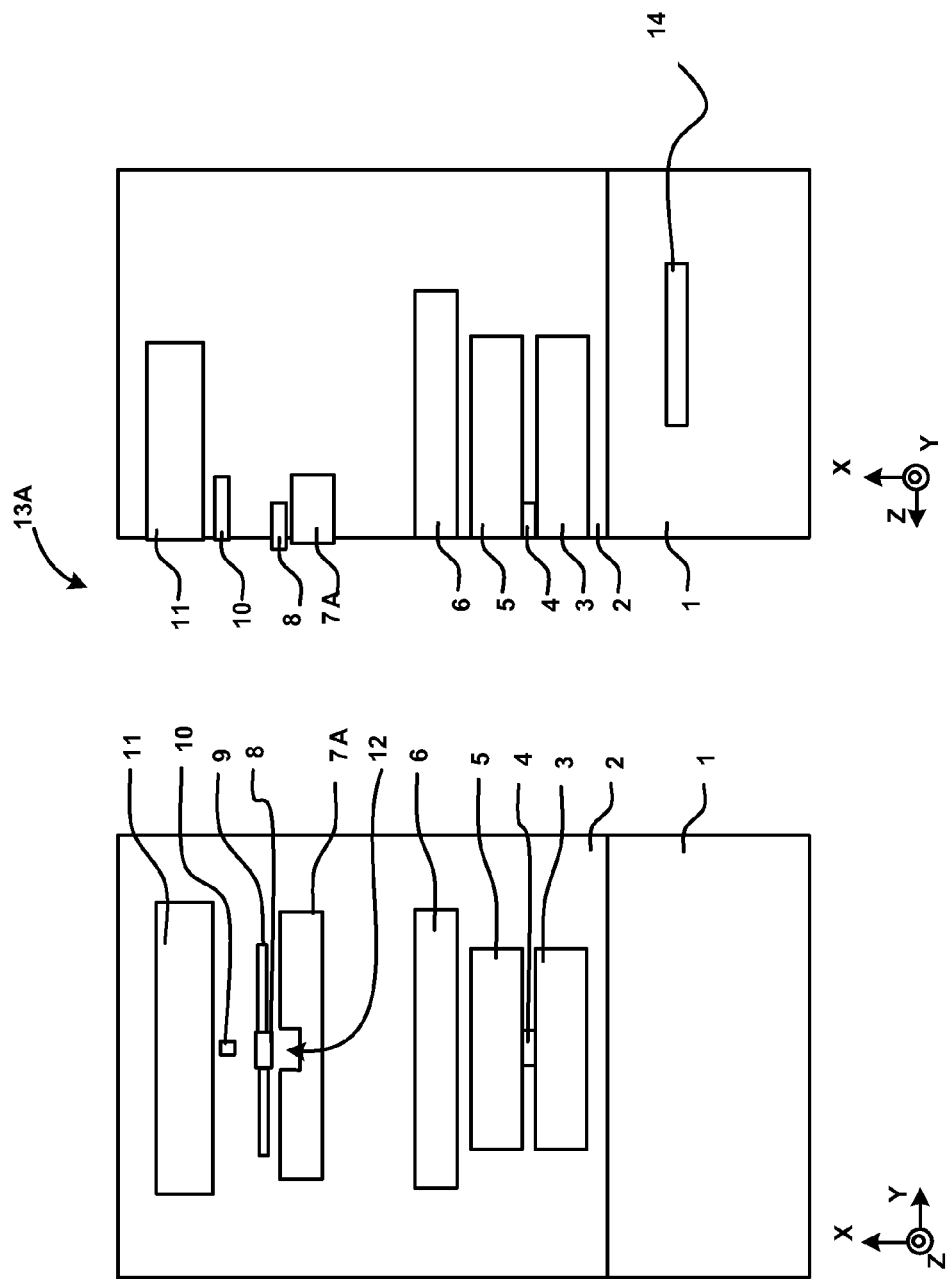
FIGS. 2A-D illustrate examples of a head slider, in accordance with an embodiment of the present invention.

FIG. 2A depicts head slider 13A, in accordance to an embodiment of the present invention. The left-side diagram of FIG. 2A shows the surface of the head slider 13A opposing the disk medium (not shown). The right-side of FIG. 2A shows a cross-sectional view of the head slider in the Z-axis direction. A layer 2 constituted from alumina (Al2O3) or the like is formed in the positive direction in the X-axis of the main body portion 1 of the head slider 13A. A lower shield 3, a read head 4, an upper shield 5, a component member 6, an contact sensor element 8, an electrode 9 of the contact sensor element 8, a write head 10 and a wrap around shield (WAS) 11 are formed on the layer 2. In one embodiment, head slider 13A includes a thermal flying-height control element (TFC) 14.

A shield structure 7A constituted from a metal of lower thermal conductivity than the contact sensor element 8 and greater hardness than the contact sensor element 8 is provided on the main body portion 1-side of the contact sensor element 8. The shield structure 7A is electrically connected to the main body portion 1 of the head slider 13A by the employment of a conductive wire (not shown in the diagram) formed in the interior of the layer 2. This connection removes the electrification of the shield structure 7A and, as a result, electrical noise is able to be reduced.

The shield structure 7A affords a reduction in electrical noise, increased signal noise (S/N) ratio of contact sensor element 8, and improved contact detection sensitivity. In addition, the provision of the shield structure 7A renders contact between microscopic particles and the contact sensor element 8 less likely and, in turn, renders damage to the contact sensor element less likely. Furthermore, the contact sensor element status is able to be ascertained by the provision of a circuit for monitoring contact sensor element resistance to evaluate the extent of damage.

An effect of the shield structure 7A constituted from a material such as, for example, Fe, Ni, Cu or Cr alloy is a reduction in magnetic noise. The optimum size of this shield structure 7A is determined in accordance with the magnitude of the coercivity of the disk medium of the magnetic disk device (not shown in the diagram). In one embodiment, a size that approximates the size of the component member 6 is suitable.

A gap 12 is provided in proximity of the contact sensor element 8 of the shield structure 7A. A material (alumina) the same as the material from which the layer 2 is constituted is packed into this gap 12. The thermal conductivity of this alumina is usually less than the thermal conductivity of the shield structure 7A. Accordingly, dissipation of the heat of the contact sensor element 8 to the shield structure 7A is prevented, and the contact detection sensitivity of the contact sensor element 8 is able to be improved.

The disk medium is provided in the positive direction in the Z-axis of the shield structure 7A. The amount that the shield structure 7A protrudes to the disk medium-side is not less than 1 nm less than the amount the contact sensor element 8 protrudes to the disk medium-side. This configuration maintains the contact sensitivity of the contact sensor element 8 able to be maintained while as far as possible preventing contact between the contact sensor element 8 and the microscopic particles trapped between the disk medium and the head slider 13A.

The power supply electrodes of the contact sensor element 8 are electrically connected to the main body portion of the slider by way of a resistor. This configuration prevents the generation of a large voltage between the contact sensor element 8 and shield structure 7A when a shorting of the contact sensor element 8 and the shield structure 7A occurs and, in turn, prevents breakdown of the contact sensor element 8.

A circuit (not shown) is provided for monitoring the contact sensor element 8 resistance value to evaluate the extent of damage. This configuration allows for the extent of the damage to the contact sensor element 8 to be evaluated and, in turn, the status of the contact sensor element 8 to be ascertained. If the contact sensor element 8 has been damaged, the user of the magnetic disk device is notified of the existence of this damage. This notification allows the user the opportunity to either avoid recording any information or to replace the magnetic disk device prior to any possible breakdown of the magnetic disk device, and ensures the "user-friendliness" of the device.

Figure 2B:
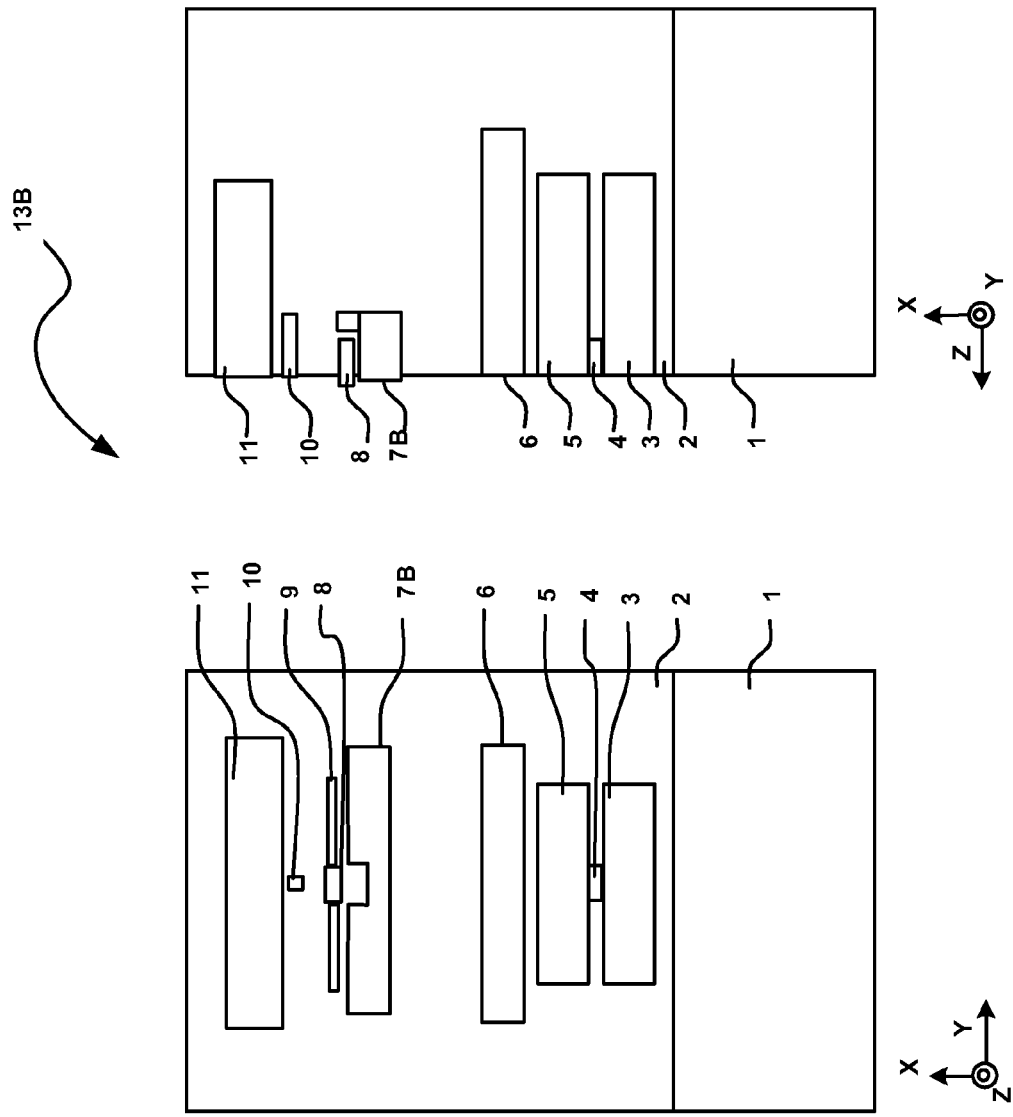

FIG. 2B depicts head slider 13B, in accordance to an embodiment of the present invention. Head slider 13B is similar to head slider 13A. However, a shield structure 7B is provided in the X-axis direction in the interior of the head slider 13B. A write head 9 and a TFC (not shown in FIGS. 2B-D) or similar are provided in the interior of the head slider 13B. The shield structure 7B affords a reduction in the electrical noise that leaks from these elements or the wiring thereof when a voltage is imparted to these elements. And, the shield structure 7B affords a reduction in the magnetic noise from write head 10.

Figure 2C:
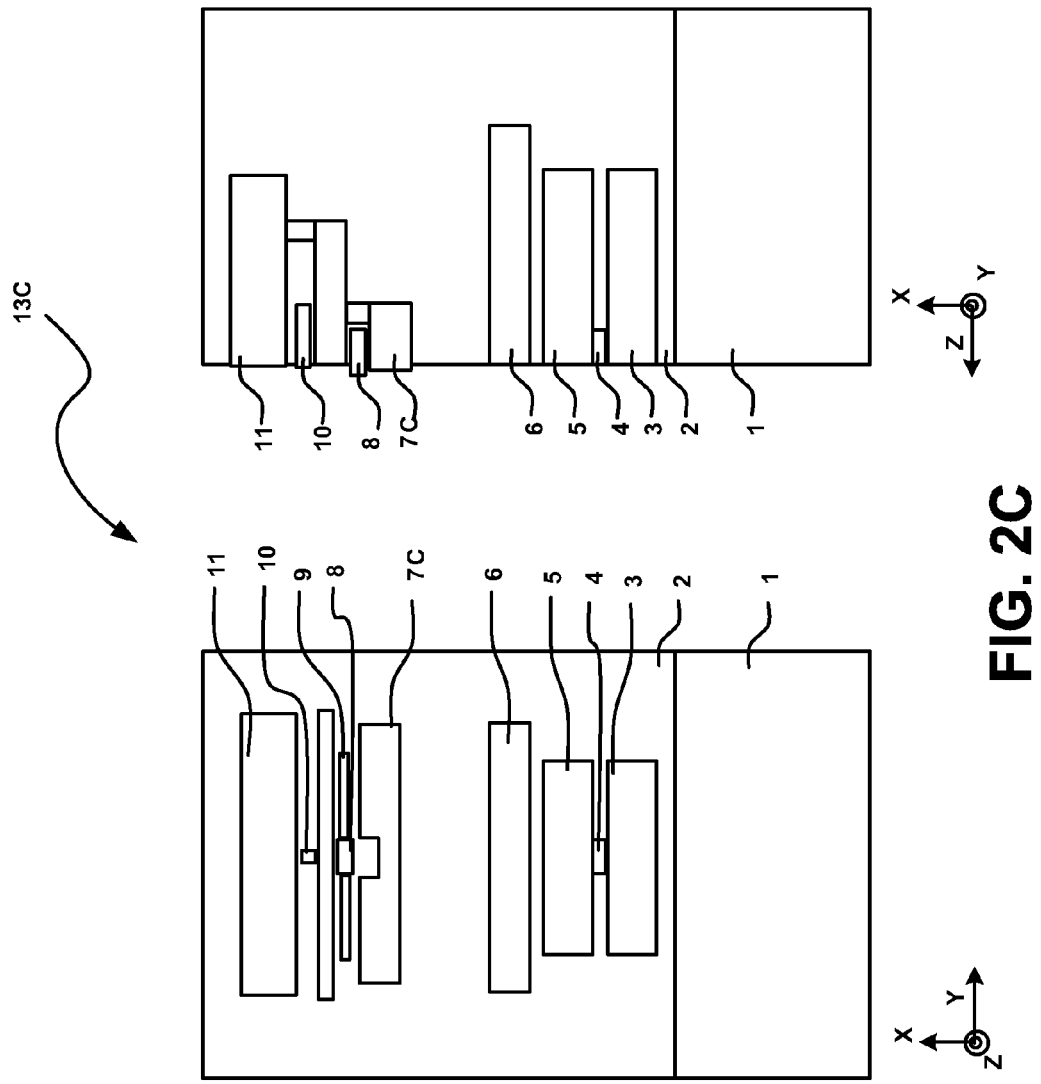

FIG. 2C depicts a head slider 13C, in accordance to an embodiment of the present invention. Head slider 13C is similar to head slider 13B. However, the shield structure 7C is integrated with a WAS 11. This configuration affords a reduction in the electrical and magnetic noise from the positive direction of the X-axis, including the electrical noise that is generated when a voltage is imparted to the write head 9, and the magnetic noise from write head 10.

Figure 2D:
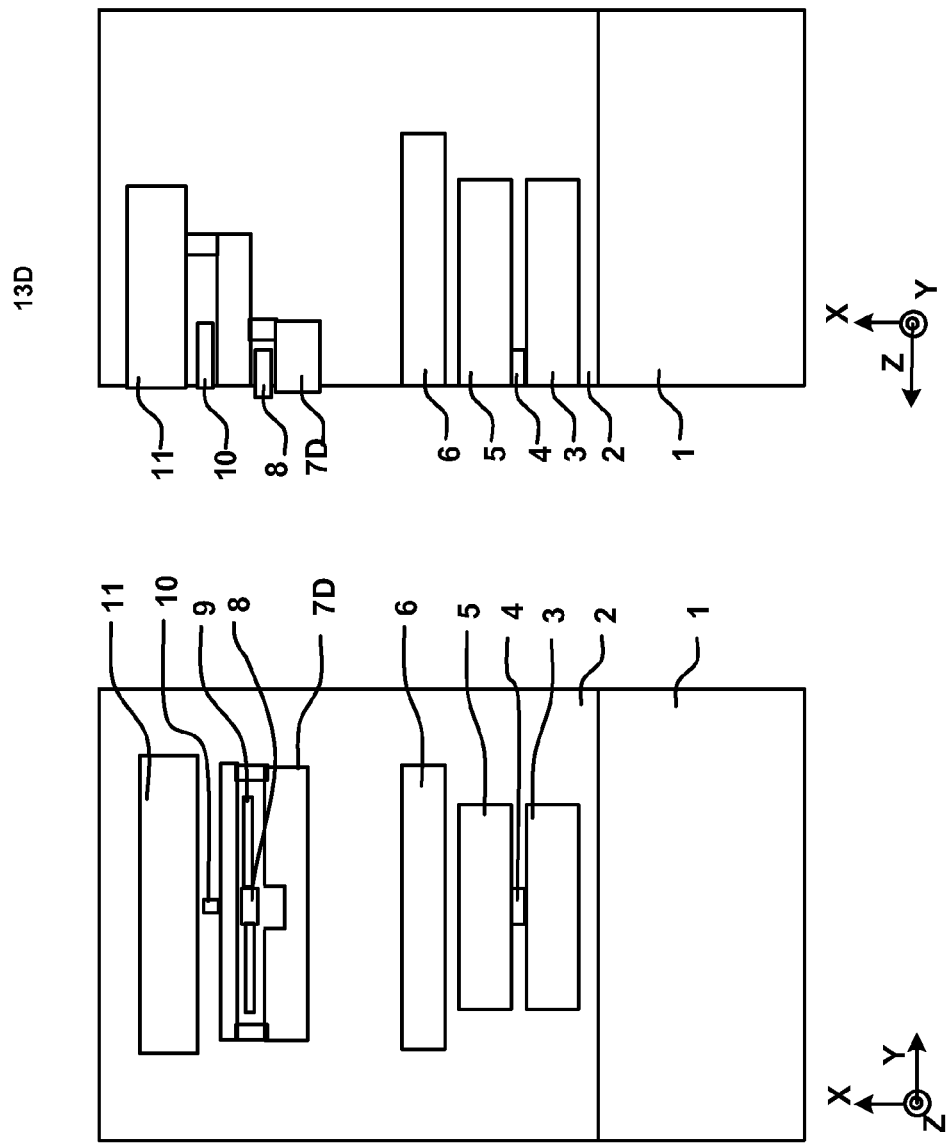

FIG. 2D depicts a head slider 13D, in accordance to an embodiment of the present invention. Head slider 13D is similar to head slider 13C. However, shield structure 7D is provided in the Y-axis direction of the contact sensor element 8. The effect of the provision of the shield structure 7D in the Y-direction is to afford a reduction in electrical and magnetic noise from the Y-axis direction. The Y-axis direction defines the direction of the head slider 13 when it performs a seeking operation in the radial direction of the disk medium.

Figure 3:
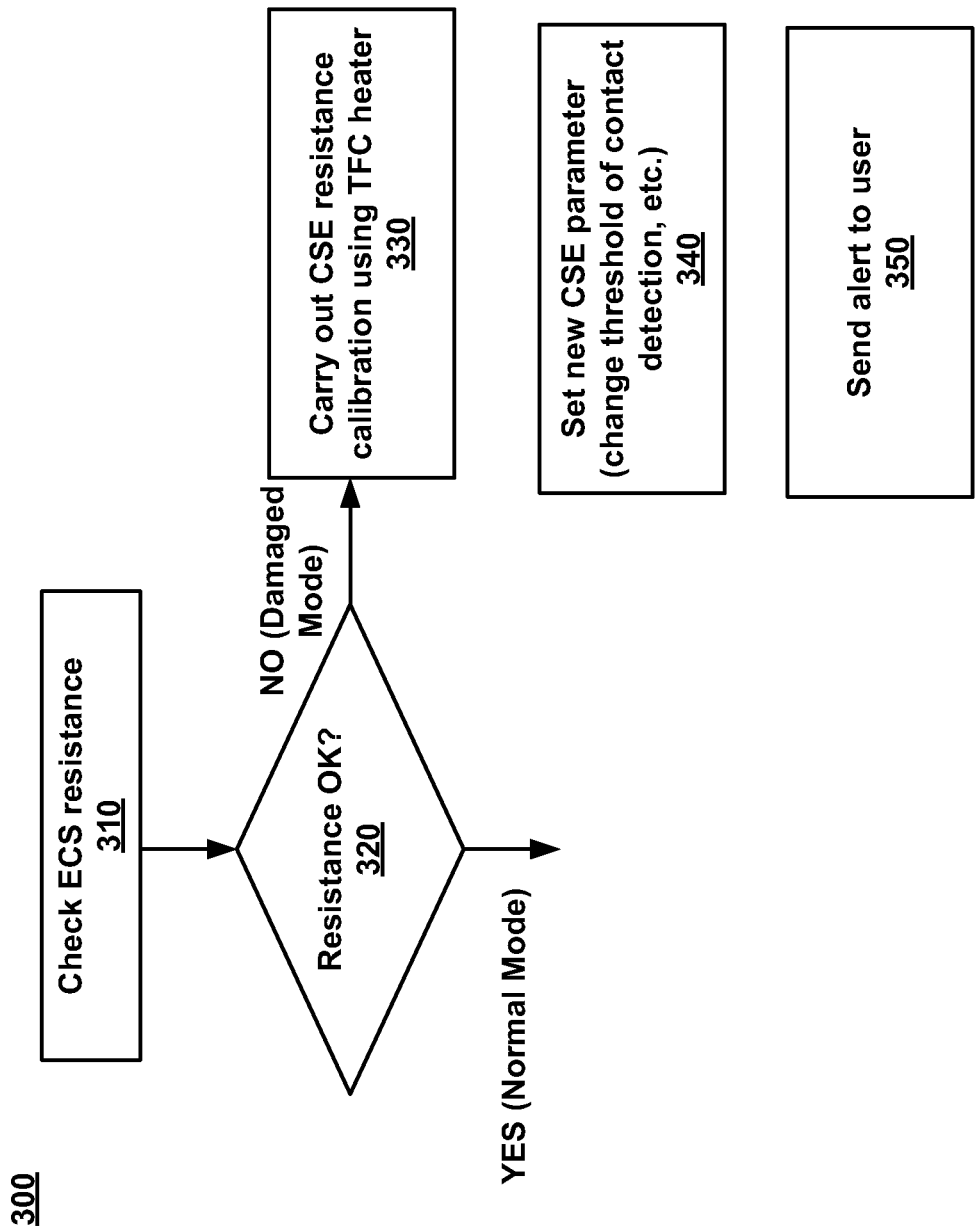
FIG. 3 illustrates of a flow chart of a method for detecting damage of a contact sensor element, in accordance with an embodiment of the present invention.

FIG. 3 depicts method 300 for evaluating the existence of damage on the contact sensor element 8, in accordance with an embodiment of the present invention. In various embodiments, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 300 is performed at least by HDD 100 as described in FIG. 1.

The resistance value of the contact sensor element 8 is measured at 310 of method 300. If the contact sensor element 8 resistance value is within a predetermined value range, at 320, the contact sensor element 8 is deemed to be normal, and the operation remains in normal mode. If the contact sensor element 8 resistance value is outside the predetermined range at 320, contact sensor element 8 is deemed to be damaged by particle contact or the like. Next, the contact sensor element 8 is heated by the heat generated from a TFC as a result of current flowing to the TFC, and a calibration of the resistance value of contact sensor element 8 is carried out, at 330. The "calibration" referred to here defines a determination of the relationship between the temperature and the resistance value of the contact sensor element 8. Next, the set value for contact sensor element 8 contact detection is changed, at 340. Thereafter, an alert is issued to the HDD user, at 350. Subsequently, the operation shifts to end.

Various embodiments of the present invention are thus described. While the present invention has been described in particular embodiments, it should be appreciated that the present invention should not be construed as limited by such embodiments, but rather construed according to the following claims.

The invention claimed is:

1. A slider comprising:
   a main body portion;
   a contact sensor element comprising a power supply electrode electrically coupled with a resistor, said resistor electrically coupled with said main body portion, said contact sensor element coupled with said main body portion and configured to respond to a change in resistance due to a change in temperature; and
   a shield structure, wherein said shield structure comprises a lower thermal conductivity than said contact sensor element and a greater hardness than said contact sensor element, wherein said shield structure is electrically coupled with said main body portion of said slider.

2. The slider of claim 1, wherein a material of said shield structure is selected from a group consisting of:
   iron, nickel, copper and a chromium alloy.

3. The slider of claim 1, comprising:
   a gap between said contact sensor element and said shield structure.

4. The slider of claim 3, comprising:
   a material disposed within said gap, wherein a thermal conductivity of said material is less than said thermal conductivity of said shield structure.

5. The slider of claim 1, wherein said shield structure protrudes one nanometer less or more than said contact sensor element.

6. The slider of claim 1, comprising:
   a wrap around shield, wherein said shield structure is integrated with said wrap around shield.

* * * * *